Aug. 9, 1932.   E. C. D'AMROW   1,870,495
CENTRIFUGAL FRICTION CLUTCH
Filed Dec. 30, 1931
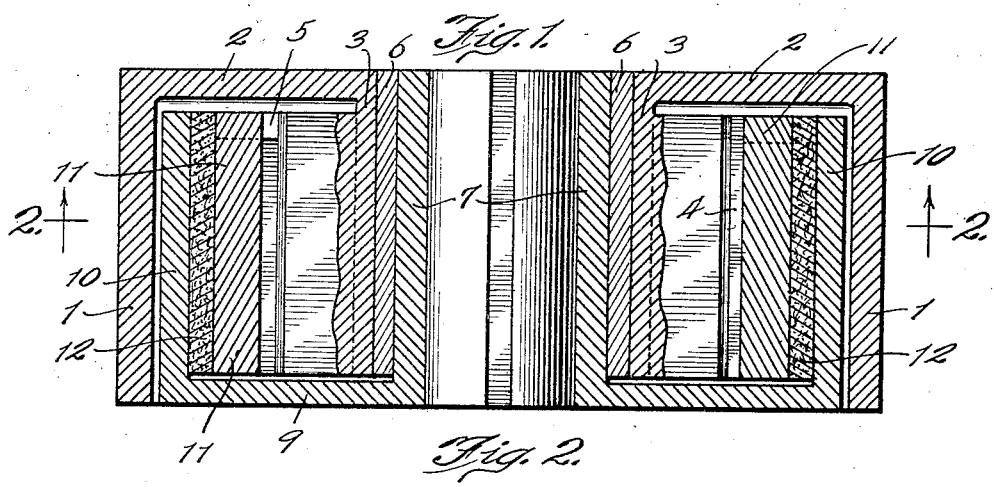
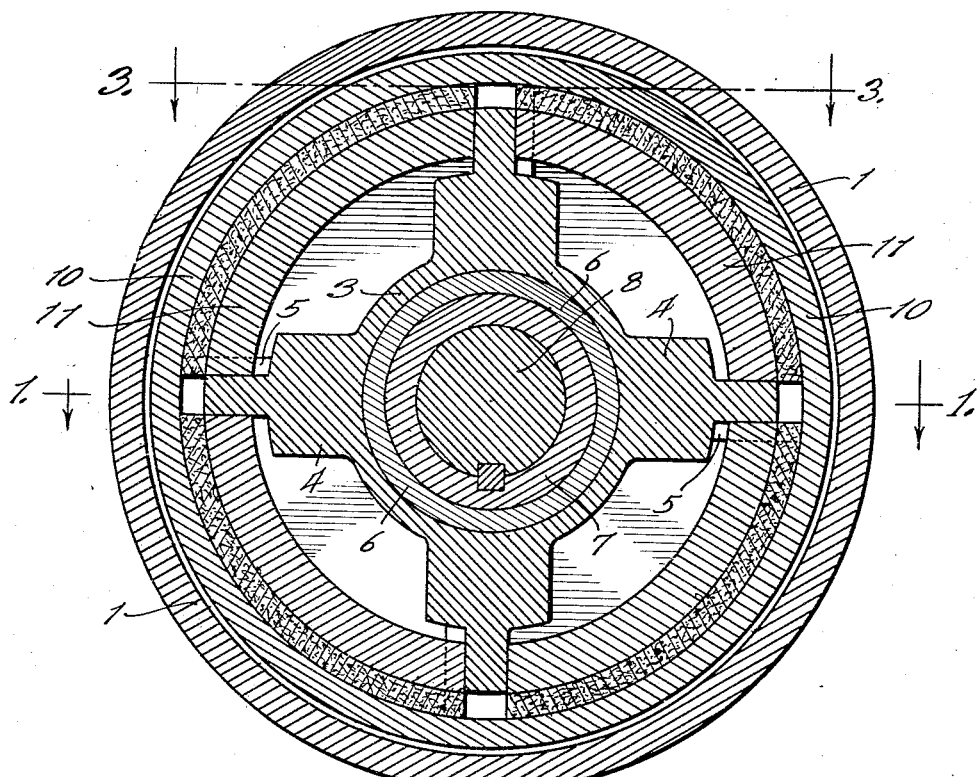
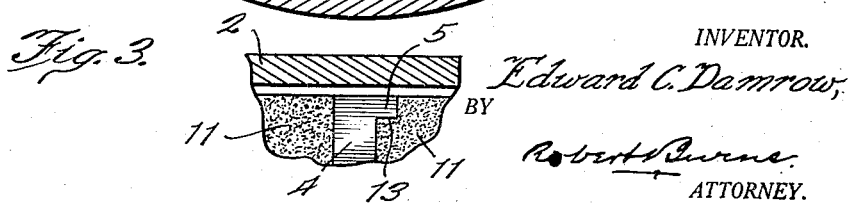
INVENTOR.
Edward C. Damrow,
BY Robert Burns,
ATTORNEY.

Patented Aug. 9, 1932

1,870,495

UNITED STATES PATENT OFFICE

EDWARD C. DAMROW, OF FOND DU LAC, WISCONSIN, ASSIGNOR TO DAMROW BROTHERS COMPANY, OF FOND DU LAC, WISCONSIN, A CORPORATION OF WISCONSIN

CENTRIFUGAL FRICTION CLUTCH

Application filed December 30, 1931. Serial No. 583,857.

This invention relates to that type of centrifugal friction clutches in which a plurality of radially moving friction shoes of an arcuate form in cross-section are adapted under high speed revolution of the driving member of the clutch to gradually attain the required frictional driving engagement with the driven member of the clutch. And this improvement has for its object:

To provide a structural formation and combination of parts in a centrifugal clutch mechanism wherein a belt pulley or the like connected to a power source constitutes the driving means of the driving clutch means and carries the centrifugal friction shoes by which driving engagement is had with the driven member of the clutch, and whereby a compact arrangement of the clutch parts, with an effective enclosure and maintenance of same in proper operative relation, is attained, all as will hereinafter more fully appear. In the accompanying drawing:

Fig. 1 is a central longitudinal section on line 1—1, Fig. 2 of a clutch embodying the preferred form of the invention.

Fig. 2 is a transverse section on line 2—2, Fig. 1.

Fig. 3 is a detail sectional elevation on line 3—3, Fig. 2, illustrating the means for preventing endwise shift of the friction shoes from their proper position.

Like reference numerals indicate like parts in the several views.

In this invention the driving member of the clutch comprises an outer annular portion or rim 1 adapted to receive motion from a power source and to such end will have the form of a belt pulley or like suitable formation.

At one end the portion or rim 1 is integrally connected to an end head 2, which in turn has an integral formation with an inner cylindrical sleeve 3, the bore of which has revoluble bearing support on a sleeve-like hub of the hereinafter described driven clutch member.

In addition to the above, the driving member of the clutch comprises a plurality of radially extending fins or blades 4 of an integral formation with the aforesaid end head 2 and sleeve 3, and preferably having an offset or stepped formation as shown, with each fin or blade having an outer portion of a rectangular form for operative engagement of one of the hereinafter described centrifugal friction shoes of the clutch mechanism. And in the preferred construction, the fins or blades 4 extend approximately the length of the aforesaid inner cylindrical sleeve 3, with their free ends formed with lateral and radially extending stop lugs or ribs 5, and with a view to reduce friction and wear of parts, the sleeve 3 will usually be provided with a lining 6 of anti-friction metal or material.

The driven member of the clutch comprises an inner annular hub 7 of a cylindrical sleeve form adapted to be keyed or otherwise fixedly secured to the driven shaft 8 of the mechanism with which the clutch mechanism is associated. In the construction shown, the perimeter of said cylindrical hub 7 provides a journal bearing for the aforesaid inner annular sleeve 3 of the driving clutch member. At one end said hub 7 has integral connection with an end head 9, which in turn has an integral formation with an outer annular shell portion or sleeve 10, that has concentric relation to the axis of revolution of the clutch mechanism.

In this improvement the respective end heads 2 and 9 of the driving and driven clutch members, are located at opposite ends of the mechanism, with the outer annular rim or portion 1 of the driving clutch member in encircling relation to the outer annular shell or sleeve 10 of the driven clutch member, with slight clearance between adjacent faces of the parts with a view to avoid undue frictional retardance, as the rim portion 1 rotates independent of the hub 7 in the starting and slow revolution of the driving clutch member.

The means intermediate of the driving and driven members of the clutch mechanism, and by which operative engagement between the same comprise a plurality of friction blocks or shoes 11, of a segmental form in cross-section, loosely arranged in the spaces between the aforesaid radial fins or blades 4 of the driving clutch member, with their outer convex surfaces adapted for frictional engagement with the inner circular face of the outer shell or sleeve 10 of the driven clutch member, and with a view to effective clutching action, the shoes 11 will be preferably provided with a layer of material 12, of a material having proper frictional properties and such, for instance, as used in brake linings now in general use.

Each of said blocks or shoes 11 are formed at one corner with an angular recess 13 to afford guiding engagement with the radial guide ribs 5 of the radial fins or blades 4 of the driving clutch member.

The operation of this mechanism is substantially the same as the present type of centrifugal friction clutches, to wit:—

As the speed of rotation of the driving clutch member increases a consequent outward centrifugal tendency on the part of the friction blocks or shoes 11 is set up, with a gradual increase in the frictional engagement of said blocks or shoes with the inner surface of the sleeve or shell 11 of the driven clutch member, until the required degree of clutching engagement between the parts is attained.

Having thus fully described my invention, what I claim as new, is:—

A centrifugal clutch mechanism, comprising in combination a driving member consisting of an inner cylindrical hub portion, a head forming part of said hub portion with its outer margin formed for driving engagement with a power source, and a plurality of radial blades forming a fixed part of the said hub portion, and providing intervening receiving spaces, a driven clutch member consisting of an inner cylindrical hub and an outer annular shell or sleeve portion united together by an end head, and a plurality of friction shoes of a segmental form arranged in the cavities between the aforesaid radial blades, with their outer convex faces adapted for frictional engagement with the inner circular face of the outer shell or sleeve of the driven clutch member, the friction shoes having corner recesses and the radial blades having end guide ribs engaging said recesses.

In testimony whereof I hereunto affix my signature.

EDWARD C. DAMROW.